Sept. 1, 1964    J. N. KHAZZAM    3,146,965
SPINNING REEL
Filed Nov. 24, 1961    2 Sheets-Sheet 2
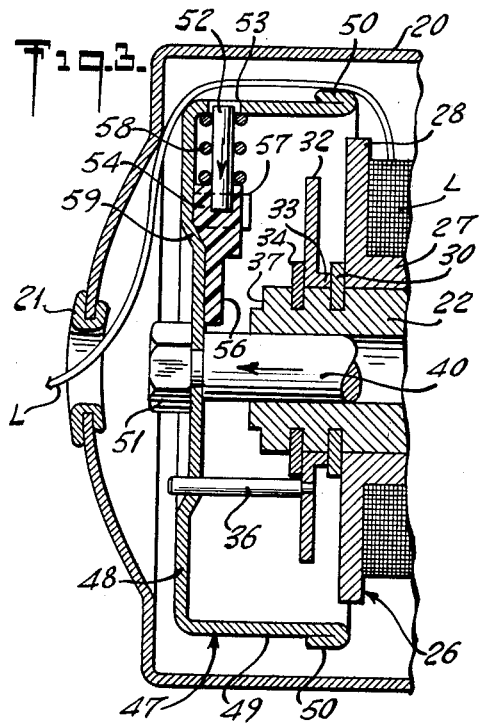
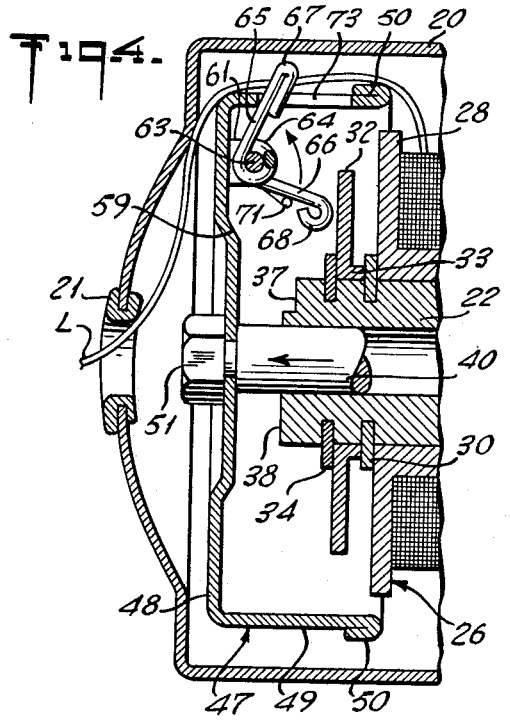
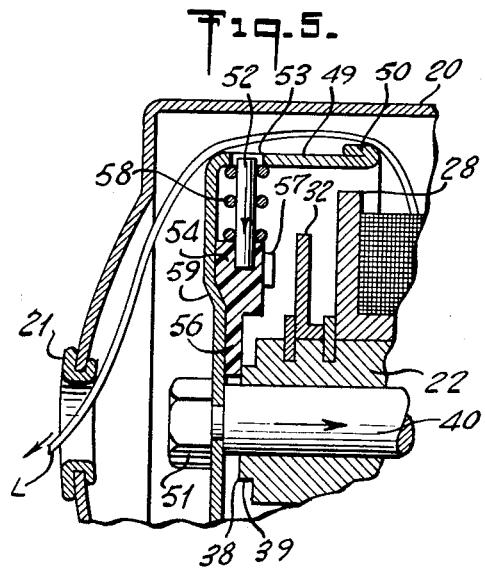
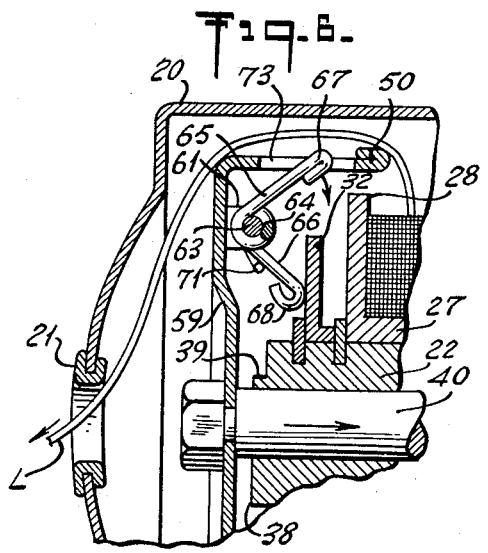
INVENTOR
JOSEPH N. KHAZZAM
BY
William R. Liberman
ATTORNEY

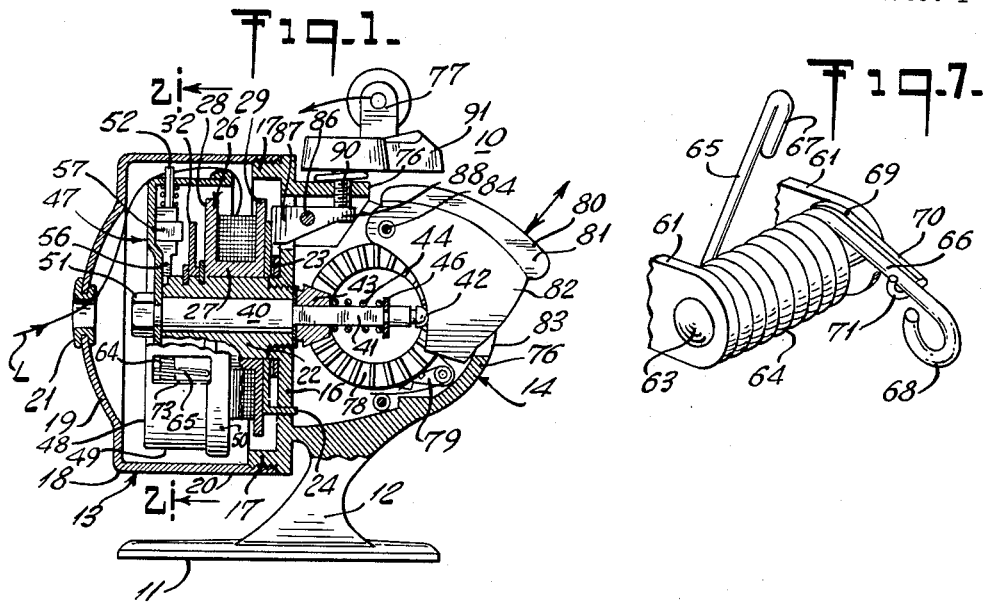

United States Patent Office 3,146,965
Patented Sept. 1, 1964

3,146,965
SPINNING REEL
Joseph N. Khazzam, Baldwin, N.Y., assignor to Regent Sports Company, New York, N.Y., a partnership composed of Joseph Lipman and Irving Lowner
Filed Nov. 24, 1961, Ser. No. 154,609
4 Claims. (Cl. 242—84.2)

The present invention relates generally to improvements in finishing reels, and in particular it relates to improvements in closed face spinning reels commonly known as spin-casting reels.

The conventional spin-casting reel includes a stationary or adjustable drag spool and a coaxial rotatable rotor cap registering with the spool and carrying a line-engaging pick-up pin radially movable between a retracted line-disengage position and an advanced line-engage position projecting beyond the peripheral skirt of the rotor cap. The rotor cap and spool are located in a housing having an axial opening through which the line passes. The rotor cap is mounted on an axially movable shaft which is rotated by a take-up handle, and a finger piece is provided to move the shaft and rotor cap axially. A mechanism is provided for advancing the pick-up pin upon rotation of the rotor cap and for retracting the pin upon advance of the rotor cap-carrying shaft. When the rotor cap is urged to its forwardmost position by the thumb piece, its leading edge abuts the housing wall to engage and lock the line and prevent its pay-out. When the rotor cap is rotated, the pick-up pin engages the line and winds it on the spool, and when the shaft is advanced to retract the pick-up pin the line may be freely payed out.

The conventional spin-casting reel typified by the above structure possesses numerous disadvantages and drawbacks. Preparatory to the casting operation, the rotor cap is advanced into abutment with the housing wall to engage and lock the line which is then released following the casting stroke by permitting the retraction of the rotor cap. The manner in which the line is locked between the rotor cap and the housing wall effects the pinching thereof causing damage to and weakening of the line and frequently causing it to break, usually at a most inopportune time. Furthermore, it is often desirable to interrupt the cast in mid-air and this is accomplished by locking the line between the rotor-cap and housing wall, as aforesaid. This procedure is frequently accompanied by undesirable results. The line may bear, in addition to the hook and bait, relatively heavy weights which carry the line in its flight with considerable momentum. The abrupt locking of the line in flight by pinching possesses important drawbacks. The inertia of the travelling weighted end of the line applies a high force to the suddenly pinched line with a high probability of snapping the line. In addition, the abrupt stopping of the line results in a sudden jerk which is annoying and uncomfortable and, furthermore, leads to recoil of the bait and hook. It is thus clear that the conventional spin-casting reel leaves much to be desired.

It is, therefore, a principal object of the present invention to provide an improved fishing reel.

Another object of the present invention is to provide an improved closed-face spinning reel of the type known as a spin casting reel.

Still another object of the present invention is to provide a spin-casting reel having a novel and improved line control mechanism.

A further object of the present invention is to provide in a spin-casting reel a line braking mechanism in which a controllable braking force may be applied to the line.

Still a further object of the present invention is to provide a line braking mechanism of the above nature characterized in the minimizing of damage and possible breakage of the line, the reduction of jerk and recoil, and in being of simple and rugged construction, easy to operate.

The above and other objects of the present invention will become apparent from a reading of the following description, taken in conjunction with the accompanying drawings, wherein FIGURE 1 is a side elevational view, partially in section, of a spin casting reel embodying the present invention;

FIGURE 2 is a sectional view taken along line 2—2 in FIGURE 1;

FIGURE 3 is a sectional view taken along line 3—3 in FIGURE 2, the reel being illustrated in the line braking casting position;

FIGURE 4 is a sectional view taken along line 4—4 in FIGURE 2, the reel being in the position shown in FIGURE 3;

FIGURE 5 is a fragmentary sectional view similar to FIGURE 3 with the rotor cap in line release position;

FIGURE 6 is a fragmentary sectional view similar to FIGURE 4 with the rotor cap in line release position; and FIGURE 7 is an enlarged perspective view of the line braking assembly.

Many of the drawbacks of the conventional spin casting reel are overcome and the objects of the present invention are achieved by eliminating the line pinching mechanisms of the conventional spin-casting reel and employing a line-engaging element on the reel rotor cap and finger-actuated means for moving the line-engaging element between an advanced line-engage position beyond the outer peripheral face of the rotor cap skirt and a retracted line-disengage position inside said face. The rotor cap is movable forwardly in the usual manner from its retracted position to retract the pick-up pin and release the line for free pay out. Upon substantially full advance of the rotor cap, the line-engaging element is advanced to engage the line and limit further pay out to rotation of the spool so that the rate of continued pay out depends upon the drag on the spool. The use of the present mechanism avoids pinching of the line with its undesirable consequences. In addition, jerking, recoil and abrupt braking and snapping of the line are likewise avoided.

Referring now to the drawings which illustrate a preferred embodiment of the present invention, reference numeral 10 generally designates the improved reel which includes a coupling tang 11 for mounting the reel on a fishing rod in the usual manner. Projecting upwardly from tang 11 is a post 12 atop which is mounted a front reel housing 13 and a rear drive housing 14 which form a unitary assembly. Front reel housing 13 includes a circular rear base 16 provided with a forwardly directed externally threaded peripheral lip 17 located shortly inwardly from the outer edge of base 16. A cup-shaped shell 18 includes a domed front wall 19 and a rearwardly directed peripheral skirt 20 internally threaded at its trailing border and separably screw engaging threaded lip 17. A central opening is formed in domed front wall 19 and engages a hard polished metal grommet 21 the opening through which defines a line guide.

A centrally disposed bearing and axle-defining axially bored post 22 projects forwardly from the housing base 16 and is aligned with a central aperture formed therein. A clutch or brake annulus 23 registers with the post 22 and substantially abuts housing base 16 and is provided with a rearwardly directed lug 24 registering with a corresponding aperture formed in the housing base 16. Rotatably supported by post 22 immediately forward of the brake annulus 23 is a spool 26 including a hub section 27 registering with post 22 and front and rear end flanges 28 and 29 respectively. Rear end flange 29 confronts the front face of brake annulus 23. Spool 26 is locked on post 22 against axial movement by a split ring 30 engaging a groove formed in the face of post 22.

A stop member-defining annulus 32 is provided with a rearwardly directed axial hub 33 rotatably registering with post 22 and entrapped between the ring 30 and a second split ring 34 engaging a groove in post 22 just forward of hub 33. Mounted on annulus 32 along the inner border thereof is a forwardly projecting coupling pin 36. The forward end face of post 22 includes a crescent shaped depressed section 37 and a raised complementary section 38 separated by a cam defining shoulder 39 extending arcuately across post 22 to opposite edges thereof.

Slidably and rotatably registering with the axial bore in post 22 is a shaft 40 having a rearwardly directed axial shank 41 of reduced cross section and with a longitudinally extending flat face, shank 41 terminating in a curved headed knob 42. A bevel gear 43, having an axial bore 20 corresponding in cross section to the flatted shank 41, slidably registers with shank 41 and is separated from the rear face of the housing base 16 by a suitable washer. A helical compression spring 44 is entrapped between the rear face of bevel gear 43, and a split ring 46 engages a groove in shank 41 to urge the shaft 40 resiliently and rearwardly and the bevel gear 43 forwardly toward base 16.

Mounted on the front end of shaft 40 and coaxial with said shaft 40 and spool 26 is a rotor cap 47 which includes a front wall 48 and a rearwardly directed peripheral skirt 49 terminating in a beaded edge 50. The front wall 48 of the rotor cap is provided with a central opening registering with a threaded shank projecting from the shaft 40 which is engaged by a nut 51 to lock the rotor cap 47 to shaft 40. The coupling pin 36 slidably registers with a suitably sized opening cap front wall 48 to rotate stop annulus 32 with the rotor cap 47 while permitting relative axial movement between them.

In order to effect selectively the winding of the line L onto spool 26, there is provided a line pick-up pin 52 which is radially oriented and registers with an aperture 53 formed in cap skirt 49 just rearwardly of cap front wall 48. Pick-up pin 52 is mounted on the outer enlarged head 54 of a cam follower 56 which is radially slidable along the rear face of cap front wall and is carried thereon by L-shaped brackets 57 engaging head 54 and formed from cap front wall 48. A helical compression spring 58 is entrapped between the confronting faces of follower head 54 and cap skirt 49 to urge follower 56 and pick-up pin 52 inwardly, which movement is limited by the shoulder 59 delineating a central depressed section of the cap wall 48 and a confronting complementary shoulder between cam follower head 54 and the inner section thereof. In its radially retracted position (FIGURES 3 and 5), the outer end of pick-up pin 52 is just inside the outside face of cap skirt 49, and in its advanced position (FIGURES 1 and 2), it reaches just short of the inner face of the shell wall 20. When rotor cap 47 and shaft 40 are in their retracted positions, cam follower 56 engages the peripheral face of post 22 rearwardly of its front face to maintain follower 56 and pick-up pin 52 in their advanced and projected positions during the rotation of rotor cap 47 and the winding operation. Upon the advance of rotor cap 47 from its retracted position, as seen in FIGURE 5 of the drawing, cam follower 56 travels out of engagement with the peripheral face of post 22 and is urged by spring 58 to its retracted position to retract pick-up pin 52 and release line L for free paying off from the spool 26. It should be noted that when cap 47 is spring-urged rearwardly, the cam follower is brought to rest on the end face of post 22. Thereafter, upon rotation of rotor cap 47, cam follower 56 falls into engagement with cam surface 37 and is urged radially outwardly to the peripheral face of post 22 with which it is maintained by the spring movement of rotor cap 47 to its fully retracted position in which pick-up pin 53 is projected to its wind position, as illustrated in FIGURE 1.

In accordance with the present invention, there is provided a selectively controlled second line engaging mechanism which is mounted on the inner face of the cap front wall 48. This line engaging mechanism includes a pair of laterally spaced lugs 61 projecting rearwardly from cap front wall 48 and supporting between them a pivot pin 63. Rockably supported by pin 63 is a bell crank formed of a single length of wire and including a knee defining helical section 64 registering with pin 63 and provided at one end with a tangentially projecting line engaging arm or element 65 and at the other end with a tangentially projecting control arm 66 forming an angle with arm 65. Arm 65 terminates in an inwardly folded end 67, and the arm 66 terminates in a rearwardly curled end 68. A hairpin spring 69 is supported by pin 63 and includes a radially projecting arm 70 terminating in a cradle shaped end section 71 which engages the underface of arm 66 to urge the bell crank including the arms 65 and 66 resiliently counterclockwisely as viewed in the drawings.

Line engaging element 65 registers with a slot 73 formed in cap skirt 49, and the curled end 68 of arm 66 engages the front face of the stop annulus 32. Thus, when rotor cap 47 is in its intermediate casting position, that is, between its fully retracted and advanced positions as illustrated in FIGURE 6, or forwardly thereof, annulus 32 bearing on the arm 66 swings the arms 65 and 66 clockwise against the urging of spring 69, to retract line engaging element 65 to the face of cap skirt 49 and out of line-engaging position. Upon advance of the rotor cap 47 to its fully advanced position, arm 66 is drawn from annulus 32 permitting it and line-engaging arm 65 to swing counterclockwise under the influence of spring 69 to bring the element or arm 65 beyond the periphery of skirt 49 to its line-engage position, as seen in FIGURE 4.

The drive housing 14 is delineated by a peripheral wall 76 formed integrally with and projecting rearwardly from base 16 and including a pair of separable side closure walls. A winding crank handle 77 is provided with a shaft suitably journalled to housing 14 and having affixed thereto a bevel gear 78 which meshes with bevel gear 43 whereby to permit rotation of shaft 40 and rotor cap 47. A pawl mechanism 79 of conventional construction selectively engages a ratchet carried by the crank shaft to prevent selectively the reverse rotation of shaft 40, in the well known manner.

The axial movement of the shaft 40 and the rotor cap 47 is controlled by a thumb piece 80 including a finger engaging section 81 located externally of housing 14, and a vertical web 82 projecting into the housing 14 through a slot 83 formed therein. The upper forward corner of the web 82 is hinged in the upper section of housing 14 by pin 84. The forward edge of web 82 bears on knob 42, so that depression of thumb piece 80 effects the advance of shaft 40 and of rotor cap 47.

The drag on spool 26 by way of the brake plate or annulus 23 is controlled by means of a bell crank member rockably supported at its knee in the upper forward part of housing 14 by a pin 86. The bell crank includes a downwardly forwardly directed arm 87 projecting through an opening in housing base 16 and bearing upon the underface of the clutch annulus 23 remote from lug 24, and a rearwardly directed arm 88. A threaded shank 90 engages a correspondingly tapped vertical bore formed in the top of housing wall 76 and bears upon bell crank arm 88. A finger piece 91 is affixed to the free end of the threaded shank 90. Thus, the degree of drag on spool 26 may be adjusted by means of finger piece 91 by controlling the screw imparted pressure to the clutch annulus 23 by way of the coupling bell crank. The spool is thus continuously adjustable from a substantially fixed condition to a position of little drag.

In employing the reel described above, the spool drag is adjusted by means of the finger piece 91 in the manner described above to a degree depending on the casting weight and desires of the caster, and preferably to a medium tension. The thumb piece 80 is then depressed and released to effect the locked retraction of pick-up pin 26 and the release of line L thereby and the desired amount of line is payed off for the casting operation. Thumb piece 80 is again depressed to move rotor cap 47 to its fully advanced position and the line-engaging element 65 to its advanced line-engaging position which effects the substantial locking of the line. The casting stroke is then effected and at the proper point in the casting stroke, finger piece 80 is released so that the rotor cap 47 is retracted by spring 44 and the line-engaging element 65 retracted to disengage and release the line L which is completely free to travel from the spool 26. If it is desired to stop the cast in mid-aid, the thumb piece is merely depressed to advance element 65 to its line engaging position to retard the further paying off of line L by a force determined by the pre-adjusted drag on spool 26 which is caused to rotate by the inertial pull on line L and thereby to release additional line. As a consequence, the line is not abruptly stopped with a sharp jerk but is permitted to run an additional predetermined length, for example one or two feet, beyond the point at which the thumb piece 80 is depressed and as the line L is in mid-air. The line thus falls gently without undue pressure on the caster, in the absence of excessive pressure on the line and without recoil.

While there has been described and illustrated a preferred embodiment of the present invention, it is apparent that numerous alterations, omissions and additions may be made without departing from the spirit thereof.

I claim:

1. A spinning reel comprising a spool, a rotor cap coaxially registering with said spool and axially movable relative thereto between an advanced and a retracted position, means for rotating said rotor cap, a line pick-up pin mounted on said rotor cap and radially movable between a line engaging advanced position and a retracted line disengage position, means urging said pick-up pin to its retracted position when said rotor cap is forward of its retracted position, means urging said pick-up pin to its advanced position when said rotor cap is rotated, a line-engaging element mounted on said cap and radially movable between an advanced line-engaging position and a retracted line-releasing position, means selectively moving said rotor cap between its advanced and retracted positions independently of the rotation thereof, means responsive to the axial movement of said rotor cap for advancing said line-engaging element independently of the movement of said pick-up pin with the advance of said rotor cap, and means responsive to the axial movement of said rotor cap for retracting said line engaging element independently of the movement of said pick-up pin with the retraction of said rotor cap.

2. A spinning reel according to claim 1, wherein said rotor cap includes a front end wall and a rearwardly directed peripheral skirt having an opening formed therein and said line-engaging element includes a first arm pivotally supported on said rotor cap in registry with said opening formed in said skirt and swingable through said opening, and said line engaging element retracting means includes a second arm connected to said first arm and forming an angle thereto and a stop member axially stationary relative to said spool and engaging said second arm.

3. A spinning reel according to claim 2, wherein said line engaging element advancing means includes spring means normally urging said second arm into engagement with said stop member and said first arm through said skirt opening.

4. A spinning reel comprising a spool, a rotor cap registering and coaxial with said spool and axially movable relative thereto between an advanced and a retracted position and including an end wall and a rearwardly directed peripheral skirt, a shell housing said rotor cap and spool having a guide-defining opening formed therein coaxial with said rotor cap, a handle coupled to said rotor cap for rotating the same, a finger piece for selectively moving said rotor cap between its advanced and retracted position, a line pick-up pin mounted on said rotor cap and radially movable between a retracted position inside the outer surface of said skirt and an advanced position beyond said skirt outer surface, means responsive to the rotation of rotor cap urging said pick-up pin to its advanced position, means responsive to the axial movement of said rotor cap forward of its retracted position to release said pick-up pin to its retracted position, a line-engaging element mounted on said rotor cap and including a first arm pivotally mounted on said rotor cap and swingable between a retracted position inside the outer surface of said skirt and an advanced position beyond said skirt outer surface, means responsive to the axial position of said rotor cap urging said line-engaging element to its retracted position with retraction of siad rotor cap independently of the radial movement of said pick-up pin and including a second arm connected to said first arm and a stationary abutment member engaging said second arm, and means responsive to the axial movement of said rotor cap for advancing said line engaging element independently of the radial movement of said pick-up pin with the advance of said rotor cap.

References Cited in the file of this patent

UNITED STATES PATENTS

| 2,667,312 | Denison et al. | Jan. 26, 1954 |
| 2,862,679 | Denison et al. | Dec. 2, 1958 |
| 3,034,741 | Macy et al. | May 15, 1962 |

FOREIGN PATENTS

| 588,742 | Canada | Dec. 15, 1959 |
| 610,752 | Canada | Dec. 20, 1960 |